Figure 1:
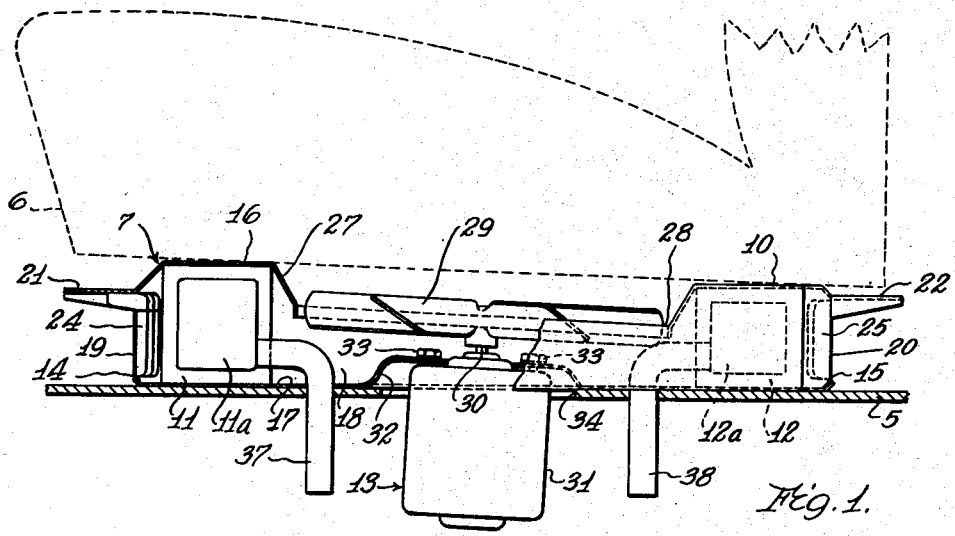

Feb. 3, 1942.  H. J. FINDLEY  2,272,046

UNDER SEAT AUTOMOBILE HEATER

Filed April 3, 1940

INVENTOR.
Howard J. Findley
BY John F. Stark
ATTORNEY.

Patented Feb. 3, 1942

2,272,046

UNITED STATES PATENT OFFICE 2,272,046

UNDER SEAT AUTOMOBILE HEATER

Howard J. Findley, Shaker Heights, Ohio, assignor to Eaton Manufacturing Company, Cleveland, Ohio, a corporation of Ohio Application April 3, 1940, Serial No. 327,603

3 Claims. (Cl. 98—2)

This invention relates to automobile heaters in general and more particularly concerns a heater of improved construction and arrangement for placement under the limited space beneath the front and/or rear seat of the vehicle body and whereby a more satisfactory distribution of the heated air is obtained.

Among the objects of the present invention is the provision of an automobile heater of a novel form and construction such that it can be installed under the seat in quarters so limited that the air inlet in the top wall of the heater casing is practically in contact with the lower face of the overlying seat and still supply adequate amounts of heated air directly to the front and rear compartments of the automobile; the provision in an automobile under-seat heater as above described, in which the top wall of the heater casing has a depressed or channeled section extending transversely of the vehicle between the side walls of the heater including a central axially disposed aperture therein and in conjunction with the underside of the overlying seat forms an air inlet passage.

Other objects of the invention include the provision of an improved construction for an under-seat automobile heater as above described in which heat-exchange cores of different size or heating capacity are arranged so that streams of heated air of different volumes or heat content can be directed to different portions of the automobile, and in which one pair of side walls of the heater casing are provided with large and small openings adjacent which are placed the respective sizes of heat-exchange cores, and including fan means actuated by a driving means disposed at an angle between said heat-exchange cores of unequal size so as to force the larger quantity of air through the core of greatest heating capacity.

Further and other objects of the invention may be briefly summarized as consisting in certain novel combinations and arrangements of parts hereinafter described when considered in conjunction with the drawing forming a part of this specification and particularly pointed out in the appended claims.

Figure 2:
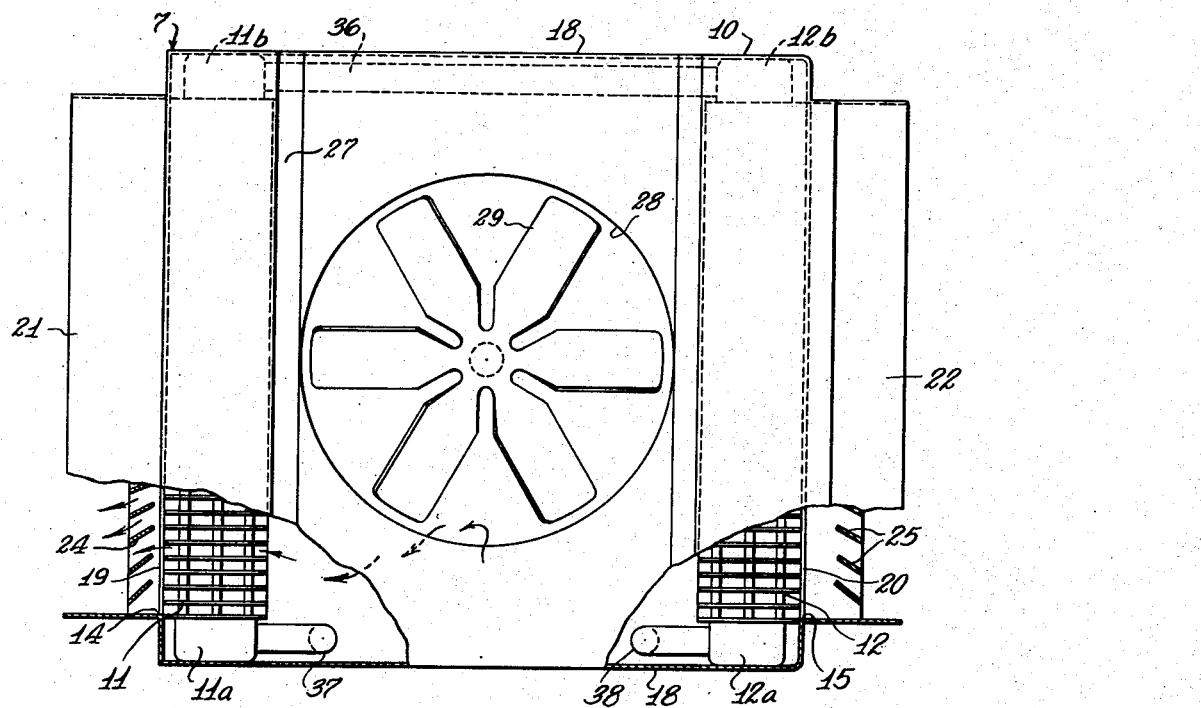

In the drawing like reference characters denote similar parts throughout the several views, and in which:

Fig. 1 is a partial vertical longitudinal section taken through an under-seat heater embodying the improved construction taught by this invention and showing the front seat of a vehicle overlying the top wall thereof; and Fig. 2 is a top plan view of the heater with portions thereof broken away.

In the accompanying drawing, to which more detailed reference will presently be made, there is shown an improved construction for an automobile heater particularly of the under-seat type.

Although in describing the improved constructions detailed reference will be made to the specific construction shown in the drawing, it will be understood, of course, that the invention is not limited to the particular heater arrangement herein disclosed, but includes various other constructions and arrangements coming within the scope of the appended claims. It is to be further understood that a cooling or refrigerated medium may be passed through the heat-exchange cores within the casing, in this event air passed therethrough will be tempered rather than heated, and accordingly, the scope of the appended claims are construed to cover the operation of the unit for air cooling as well as heating.

In Fig. 1 of the drawing, there is shown a vertical longitudinal section through a portion of the floor 5 of an automobile, with the front seat 6 thereof shown in broken lines spaced above the floor, as is usual in present day automobile construction. As is well known to persons skilled in this art, considerable difficulty has heretofore been experienced in getting a satisfactory distribution of heated air to both the front and rear compartments of an automobile having this general arrangement. This difficulty is overcome, as will be explained more in detail hereinafter, by providing a heater generally designated 7 of the under-seat type and locating the same beneath the front seat 6 so to deliver heated air in two separate streams directly to the front and rear compartments. A heater of the same general type as above described is covered in applicant's co-pending application filed May 6, 1939, serially numbered 272,172, and is assigned to the same assignee as the present invention. However, in this co-pending application, in some instances it was found necessary that additional clearance had to be maintained between the top wall of the heater casing and the underside of the seat, in order for the air to be heated to flow to the intake opening through this space. In other cases, where the top wall of the heater casing was in contact with the underside of the seat, it was necessary that the air to be heated pass through the cloth or fabric covering the front seat before being drawn into the heater casing by the fan. At the present time, of course, the first condition where there is sufficient clearance between the top wall of the heater casing and the underside of the seat is still suitable for the heater disclosed in applicant's co-pending application or the under-seat heater of the present application, but, in the second condition where the top wall of the heater casing is substantially in contact with the underside of the seat, it is not now practical to rely upon the porosity of the cloth or fabric covering the front seat because in the aforementioned instance while only a certain amount of cotton packing or kapok covered the tops of the seat spring coils, which had a sufficient degree of porosity, now the trend is toward a preformed latex or sponge rubber blanket or pad which forms the backing or cushion between the seat springs and the outer trim or upholstery, and which does not have the necessary porosity to admit passage of air therethrough. Accordingly, the present under-seat type heater has a depressed section or transversely extending channel in the top wall of the heater casing to afford a free and adequate passage to the air to be heated, even when the upper wall of the heater casing is in contact with the underside of the seat.

The heater 7 may comprise a casing or shell 10 having heat-exchange cores 11 and 12 therein and an air-impelling means 13 for causing air to be heated to flow through the cores and to be delivered in separate streams directly to the front and rear compartments through the spaced discharge openings 14 and 15. The casing 10 may be a hollow sheet metal structure formed of one or more parts and of generally quadrangular shape. As here shown the casing may comprise top and bottom walls 16 and 17, a pair of spaced side walls 18, and a pair of spaced end walls 19 and 20. Also in the present instance the end walls 19 and 20 have been folded up into substantially a horizontal position to form hooded sections 21 and 22 which keep the heated air discharged from the heater casing 10 close to the floor level and conduct the same out from under the overhang of the seat 6, whereby there is no opportunity for the air delivery to form eddy currents beneath the seat and diminish the total output to the front and rear compartments of the vehicle.

It is usually desirable to supply a larger amount of heat, or volume of heated air, to the front compartment of an automobile than to the rear compartment and, as will be presently seen, the novel form and construction of this heater provides this desired relative distribution and also enables the heater to be readily installed under the front seat. There are various reasons for providing this relative distribution of heated air, among which is the fact that the forward motion of the vehicle usually causes cold air to enter the front compartment more readily than it does the rear compartment. Another reason for initially supplying a larger volume of heated air to the front compartment, is that the warm air usually gravitates from the front compartment to the rear compartment by reason of the forward travel of the vehicle, thus lessening the volume of heated air which need be supplied to the rear compartment for maintaining a comfortable temperature. Moreover, the front compartment, being the driving compartment, is more frequently occupied than the rear compartment, and this provides a further reason for supplying a larger volume of heated air to the front compartment.

In order that the heater 7 may be capable of supplying this desired larger volume of heated air to the front compartment, and may better utilize the space available beneath the front seat 6, the casing and heat-exchange cores of the heater are constructed so that streams of heated air of the desired relative size or heat content will be supplied to the front and rear compartments. To this end the casing 10 is constructed with the end wall 19 thereof, which is adjacent to the front edge of the seat 6 and nearest the front compartment, relatively higher than the rear end wall 20 and make the discharge openings 14 and 15 of these end walls of corresponding relatively large and small height or size. In the discharge openings 14 and 15, there may be a series of spaced angularly disposed deflectors 24 and 25 which extend transversely from side to side of the heater casing 10 and at a suitable angle so as to deflect the air delivery from the openings in a desired direction dependent upon the location of the heater 7 under the front seat 6. The top wall 16 of the casing or shell of the heater slopes downwardly as shown in Fig. 1. The heat-exchange cores 11 and 12 of large and small size, or heat-exchange capacity, are arranged in spaced relation in the casing 10 with the larger core 11 adjacent the larger discharge opening 14 and the smaller core 12 adjacent the smaller discharge opening 15. With the relative arrangement and sizes for the heat-exchange cores and discharge openings, as just described, it will be seen that separate streams of heated air will be delivered directly into the front and rear compartment in front of and behind the seat 6 and that a greater amount of heat or larger volume of heated air can be supplied to the front compartment than to the rear.

To insure an adequate supply of air to be heated in the casing and to utilize to the best advantage the very limited space available under the seat of present day vehicles, the top wall 16 of the heater casing has a longitudinal groove or depressed channel 27 extending transversely of the heater so that, as in this instance, when the top wall of the casing is abutting or closely adjacent the underside of the seat there is no possibility of starving or shutting off the air intake of the air impeller.

Air to be heated may be drawn in or supplied to the casing 10 at one or more points. In this instance, the top wall 16 is provided with an intake opening 28 located in the channel 27 thereof centrally between the heat-exchange cores 11 and 12 and in which the fan 29 of the air impelling means 13 operates for drawing air into the casing and discharging the same in two separate streams through the cores 11 and 12 and the discharge openings 14 and 15 adjacent thereto. The fan 29 may be mounted directly on the shaft 30 of an electric motor 31. This motor may be suitably supported on the casing 10 at a point between the cores 19 and 20 and, in this instance, the bottom wall 17 has a bumped-up annular portion 32 to position the fan 29 at the right height in the intake opening 28. The motor may be secured to this raised portion 32 by suitable bolts 33.

When the heater 7 is installed in the vehicle under the front seat 6 its bottom wall 17, which is substantially flat except for the raised annular portion 32 which forms the motor support, may rest directly on the floor 5 of the automobile. When the heater is located in this relative position the top wall 16 of the casing will extend in adjacent or abutting relation to the underside of the seat 6 as the case may be. If the top wall of the casing abuts the underside of the seat due to the limited available free space thereunder, as it does in most vehicles, the transversely extending channel or depressed section 27 affords an automatic spacing or air inlet passage to the intake opening 28 therein and due to the entrances to the depressed section 27 being remotely located at opposite sides of the heater casing insures an adequate circulation of heated air from the discharge openings 14 and 15 of the casing and not a short circuiting of the air delivery direct to the intake opening.

It will be seen that the heater 7 can be easily installed in an automobile because only one large hole 34 need be cut in the floor, or the floor provided with a depression, to accommodate the depending motor 31 secured to the raised support 32. Since access can be readily had to the compartment floor at the point where this hole is to be cut, the cutting may be done by means of a hole saw, and hence laborious and costly installation operations can be avoided.

The heat-exchange cores 11 and 12 may be of the usual type of construction, that is to say, they may be finned tube structures having numerous passages for the air to be heated and having end header tanks thereon. The header tanks of the core 11 are designated 11a and 11b and the tanks of the core 12 are designated 12a and 12b.

Heating or cooling medium such as hot or cold water taken from the engine cooling system may be circulated through the heat-exchange cores 11 and 12 for tempering the air which is forced through the cores by the fan 29. Although the heating or cooling medium can be supplied to both cores simultaneously, that is to say in parallel relation to each other, it is preferred to circulate the medium through the cores in series with each other and with the hotter or cooler medium passing through smaller core 12 first and then through the larger core 11. This desired series circulation of the heat-exchange medium may be obtained by connecting the header tanks 11b and 12b of the cores 11 and 12 by the pipe 36 and connecting supply and return pipes 37 and 38, respectively, to the tanks 11a and 12a of the cores 11 and 12. This series circulation of the heat-exchange medium through the cores 11 and 12 may be desirable because it causes the hotter or cooler medium to be supplied to the core having the smaller air-tempering capacity, in this instance the core 12 which tempers the stream of air to be supplied to the rear compartment. In this way, only a portion of the heat-exchange capacity of the supplied medium will be dissipated in the core 12 for delivery to the rear compartment; and thus temperature and heat-exchange content of the medium will still be relatively great when it is supplied to the core 11 for tempering the stream of air being delivered into the front compartments.

As an additional feature, the proportioning of air to be passed through the heat-exchange cores 11 and 12 is accomplished by arranging the air impelling means with the axis of rotation of the fan in a relatively inclined position so the fan will favor one heat-exchange core over the other. In Fig. 1 the air impelling means 13 is shown mounted with its axis of rotation in such a relatively inclined position so that the fan 29 will favor the heat-exchange core 11, in this instance the larger core, and will tend to cause a larger volume of air to pass through this heat-exchange core than would pass through the core if the axis of rotation of the impelling means were vertical or normal to the plane of the bottom wall 17. As shown in Fig. 2, in which the fan 29 rotates in or adjacent the intake opening 28 in the depressed section 27 of the top wall 16, the impelling means is disposed with its axis of rotation substantially normal to the plane thereof.

From the foregoing description and accompanying drawing, it will now be readily seen that there has been provided an improved construction and arrangement of under-seat heat-exchanger whereby an adequate supply of air to be tempered is assured even when the top wall of the heater casing abuts the underside of the front seat. In addition, due to the series hook-up of the heat-exchange cores, the combination of large and small cores, and the inclination of the axis of the air impelling means so as to favor the larger core, the desired proportioning or satisfactory balance of tempered air will be supplied to the front and rear compartment of a vehicle.

While only one illustration has been shown embodying the construction and arrangement for an automobile under-seat type heat-exchanger, it will be understood, of course, that it is not intended to be limited to the precise construction and arrangement disclosed, but this invention is regarded as including such changes and modifications in practice as do not constitute a departure from the spirit and substance of the invention as defined by the scope of the following claims.

What I claim is:

1. A vehicle under-seat heat-exchanger casing comprising, a walled casing having a transversely extending depressed return air channel in its top wall provided with an air inlet therein and a pair of spaced air delivery openings in front and rear walls thereof, said front and rear walls being of high and low dimensions, respectively, said channelled top wall joining said front and rear walls being inclined with a slope rearwardly from the high front wall to the low rear wall, and a fan means mounted in the casing adapted to move air through the inlet opening in the depressed channel in the top wall thereof and discharge air through the delivery openings in the front and rear casing walls into the area adjacent the front and rear of the seat.

2. In a vehicle having spaced compartments divided by a seat elevated above the vehicle floor an under-seat heat-exchanger casing comprising, a walled body of geometrical form having a depressed section in its top wall which in conjunction with the overlying vehicle seat is arranged to define a return air supply channel, an air inlet opening to the casing interior in the central portion of the depressed section of the top wall, said casing having a high front and low rear wall each provided with an air delivery opening therein of commensurate size, and said top wall joining the high and low end walls being disposed on a rearwardly declining slope, and a fan means mounted in the casing adapted to move air through the inlet opening in the depressed channel in the top wall thereof and discharge air through the delivery openings in the front and rear casing walls into the area adjacent the front and rear of the seat.

3. In a vehicle having spaced compartments divided by a seat elevated above the vehicle floor an under-seat heat-exchanger casing comprising, a walled body of geometrical form defining a heat-exchanger chamber having top, bottom, and end walls, the top wall being depressed to form a return air channel, said depressed wall having an air inlet opening, said end walls having air outlet openings, and a fan means mounted in the chamber adapted to move air through the inlet opening in the depressed channel in the top wall thereof and discharge air through the outlet openings in the end walls of the casing into the compartments adjacent the front and rear of the seat, respectively.

HOWARD J. FINDLEY.